Oct. 13, 1970   M. D. WOODS ET AL   3,534,390

WELDING WIRE

Filed April 29, 1968

INVENTOR
Marion D. Woods
Albert J. Zvanut

BY Nilsson + Robbins
ATTORNEYS

3,534,390
WELDING WIRE
Marion D. Woods and Albert J. Zvanut, Whittier, Calif., assignors to Stoody Company, a corporation of California
Filed Apr. 29, 1968, Ser. No. 724,917
Int. Cl. B23k 35/22
U.S. Cl. 219—146                            3 Claims

ABSTRACT OF THE DISCLOSURE

A continuous electrode (for welding) is disclosed (along with the manufacturing process therefor) which electrode is in a wire form, has good arc characteristics and may be produced in small-diameter size. The continuous electrode includes a tubular enclosure containing a filler of particles that are within critical size limits, e.g. substantially all particles are less than 200 mesh size and no more than 25% of the particles are under 325 mesh size (U.S. Standard sieve). The manufacturing process described involves forming a strip of metal tape into an elongate cylindrical tube containing the critically-sized granular filler of welding-wire material. As disclosed, the wire is then completed by applying compressive rolling forces to close the elongate cylindrical tube on the filler. An exemplary process describes production of one-sixteenth inch stainless steel continuous electrode having a relative filler weight that may be as high as 50%.

BACKGROUND AND SUMMARY OF THE INVENTION

During arc-welding, metal globules or particles are transferred from the tip of a rod or wire electrode to be deposited on a plate or other workpiece. The movement of the molten metal from the wire electrode to the workpiece involves some rather complex considerations. Although the transfer is relatively independent of gravity and electrical-current direction, surface-tension forces appear to be quite significant. With regard to the nature of the metal during transfer, arc welding modes are generally characterized as either globular transfer or spray transfer. When welding is accomplished with the spray transfer, improved arc characteristics normally result and less spatter is produced. Therefore, the spray transfer is normally desirable, particularly in welding certain materials as stainless steel.

The accomplishment of the spray transfer depends upon several factors including: the electrical current density in the electrode, the welding material, the gaseous environment about the arc, and so on. Both the current density and the gaseous environment about the arc have been variously controlled in the past to accomplish spray-transfer welding. In that regard, the current density depends on the total current and the cross-sectional size of the electrode. Therefore, by employing relatively-small continuous electrode with relatively-high currents the desirable spray transfer is possible. However, frequently high current levels are undesirable because of the resulting increase in heat, as well as attendant higher arc voltages. Therefore, prior practice has been to introduce a small amount of oxygen into the gaseous environment about the arc to reduce the electrical current that is necessary to accomplish the spray transfer. This technique is undesirable because an oxidized layer is developed over the bead or weldment that is produced. Therefore, actual practice frequently involves somewhat of a compromise in one regard or another, to accomplish spray transfer in arc welding.

The problems of accomplishing an arc welding process in which the metal moves from the electrode in a fine spray, are similarly applicable to various structural forms of welding rod or wire. That is, these problems apply to fabricated welding rod or wire as well as solid wire. In this connection, various forms of fabricated electrode wire have been in widespread use for a long period of time, one form of which includes a core or filler of welding-material particles enclosed in an elongate tube or shell. Fabricated wire has been employed for reasons of economy and for the ease of manufacturing it in various desired compositions.

Although a wide variety of different fabricated welding wires have been manufactured in the past, considerable difficulty has been encountered in attempting to manufacture fabricated continuous electrodes or wires of small diameter with a significant amount of filler and with a satisfactory wall thickness. In the normal use of welding wire it is subjected to mechanical stresses and small-diameter fabricated wires (manufactured in accordance with prior techniques and containing sizable percentages of fillers), have not been able to withstand such stress. Therefore, a need exists for an improved method of manufacturing small-diameter fabricated continuous electrode, e.g. wire as used herein, containing relatively-large proportionate percentages of fillers. Furthermore, a continuing demand exists for welding wire having good arc characteristics which may be employed to accomplish the spray mode of metal transfer at relatively lower electrical currents and voltages.

In general, the present invention involves welding wire, e.g. continuous electrode, the components of which are critical in size and which wire is manufactured in accordance with the process hereof and thereby may be accomplished in small-diameter sizes, e.g. one-sixteenth of an inch with as much as fifty percent of the wire weight being in the filler. Still further, such wire has good arc characteristics and permits spray transfer at reduced current density and reduced arc voltage, as compared to solid wire of comparable size.

BRIEF DESCRIPTION OF THE DRAWINGS

In the drawings, which constitute a part of this specification, an exemplary embodiment demonstrating various objectives and features hereof is set forth, specifically.

DESCRIPTION OF THE ILLUSTRATIVE EMBODIMENT

As required, a detailed illustrative embodiment and process description of the invention is disclosed herein. The embodiment and the exemplary process exemplify the invention which may be practiced in many forms that are radically different from the detailed subject matter hereof. Therefore, specific structural, process and functional details disclosed herein are disclosed merely as a basis for the claims defining the scope of the invention.

Figure 1:
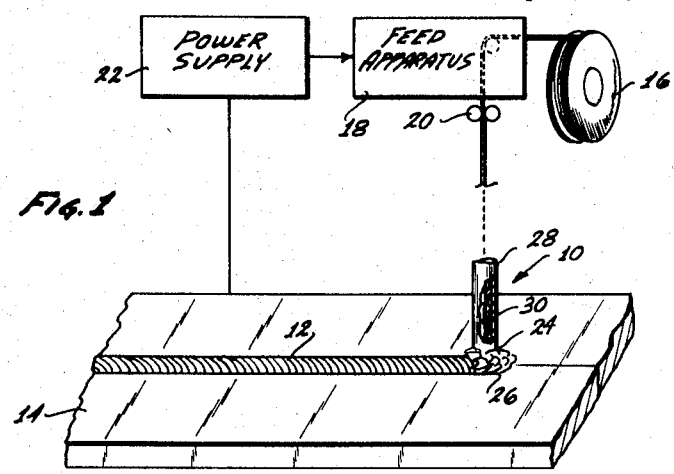
FIG. 1 is a somewhat diagrammatic and perspective view illustrating a welding operation utilizing wire in accordance with the present invention.

Referring initially to FIG. 1, a continuous electrode 10 (in accordance herewith) is depicted in a welding operation, transferring the metal to form a bead 12 on a workpiece 14. The electrode 10 is supplied from a wire spool 16 by a transport or feed apparatus 18, as generally well known in the prior art, and which includes a pair of mating rollers 20 along with structure for supplying electrical current to the electrode 10 from a power supply 22. The electrical current flowing from the electrode 10 to the workpiece 14 (and back to the power supply 22) develops an arc between the tip 24 of the electrode 10 and a crater 26 leading the weld bead 12. In accordance herewith, metal is transferred from the tip 24 to the crater 26 in a fine spray while utilizing relatively-reduced electrical current from the power supply 22. Additionally, the electrical arc at the tip 24 has good characteristics and the voltage across the arc is somewhat reduced from that of prior electrodes.

The electrode 10 structurally comprises an outer shell or enclosure of metal tape 28 filled with granular particles 30, comprising alloys or other welding wire materials. The present invention is directed to the process for manufacturing the wire electrode 10 and to the structure of that electrode.

Figure 2:
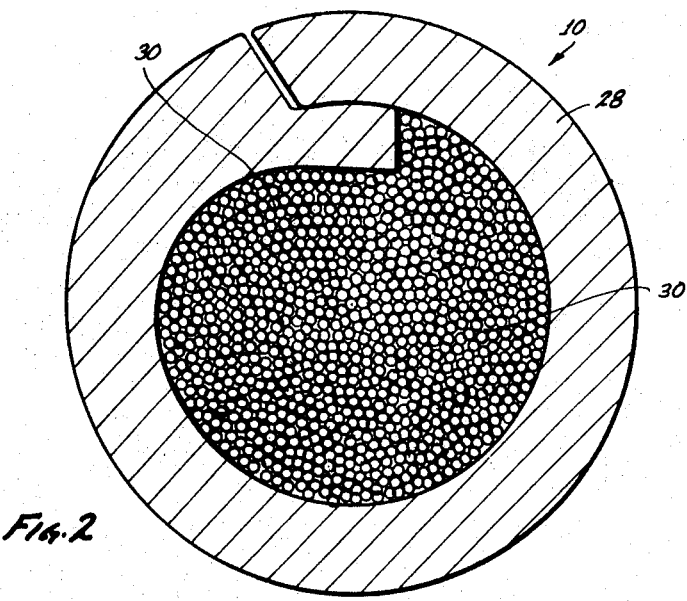
FIG. 2 is a greatly-enlarged sectional view taken along line 2—2 of FIG. 1.

A greatly enlarged sectional view of the electrode 10 is shown in FIG. 2 illustrating the manner in which the tape 28 is formed into an elongate tube to enclose the filler particles 30. Of course, the specific material of the particles 30, the relative weights between the particles 30 and the tape 28 (for a particular length of electrode 10) the specific material content of the tape 28 and the particles 30, and the various other dimensions and characteristics of the electrode 10 may conform to the vast number of different specifications. However, critical to the structure hereof the particles 30 employed to manufacture the electrode must be of a physical size which lies within somewhat precisely-defined limits. Specifically, the particles 30 must be of less than 200 mesh size. Furthermore, it has been found particularly desirable to limit the number of these particles 30 that are less than 325 mesh size, to not more than 25% by weight of the total particles 30. Upon imposing these critical limits on the size of the particles 30, a totally unobvious and unexpected result occurs. Specifically, in accordance herewith, the electrode 10 may be produced in a wire of small diameter size, e.g. one-sixteenth of an inch containing over 20% and up to even 50% by weight of filler. Additionally, the electrode enables spray transfer at substantially-reduced current levels; and for a particular current level, are voltage is significantly reduced. Furthermore, arc characteristics are generally improved over electrodes in conventional use.

To consider a number of specific examples, assume first a test situation illustrative of the present discovery which involves a weldment to join two three-eighths inch metal plates. Utilizing the practices and electrode of the prior art, in this situation, a gas mixture or argon with 2% oxygen was employed to reduce the arc voltage at which spray mode of transfer occurred along with satisfactory cleansing action. However, the oxygen in the gaseous environment about the arc resulted in a build-up of oxides on the surface of the weldment which sometimes present a considerable problem. However, utilizing an electrode as described above, an acceptable spray mode of transfer was attained at a voltage sufficiently low to eliminate the need for oxygen thereby greatly reducing the build-up of oxide on the weld surface.

Considering still another situation, in a fillet weld there is a tendency to undercut the vertical plate upon which a weldment is being formed. By reducing the arc voltage, as a result of employing an electrode of the present invention, a substantially reduced undercut was possible without sacrificing speed of operation.

The need or desire frequently arises to limit the heat which is supplied to a workpiece. Of course, this limitation may arise with small or precise workpieces or for various other reasons. In employing electrodes of the prior art to accomplish a weldment with low heat-transfer and with the spray mode, it has been common practice to reduce the electrical current to the threshold level, at which the spray transfer occurs. A problem then arises if the arc is influenced to drop below the critical threshold level, shifting the mode to a globular transfer which creates considerable spatter and which may destroy the surface of the metals involved. However, by employing an electrode in accordance herewith, relatively low current levels enables operation well above the critical threshold spray level so that inadvertent intervals of a globular mode are not likely.

In analyzing the unexpected results of the present discovery, some questions remain unsolved. However, it appears that the individual particles 30 (FIG. 1) although in intimate physical contact, nevertheless accept heat from the arc somewhat differently to accomplish the spray-mode at lower energy levels. In this regard, the individual particles 30 may also create or be subject to various forces in the arc which accomplish the spray-mode at lower temperature levels. In further testing and analyzing electrodes constructed in accordance herewith, it has been found desirable to maintain the weight of the particles 30 at least 20% of the weight of the wire.

As a somewhat-related aspect of the present invention, it has been discovered that by utilizing a particular process of manufacture, electrodes as described above, may be made of a diameter not practically possible utilizing conventional manufacturing techniques. In the past, prepared metal tape has ben formed into an elongate tube, filled with a core, then drawn or otherwise formed to the desired electrode diameter. However, as indicated above, with the filler being a substantial portion of the wire, the size to which the wire could be reduced has remained relatively large. That is, for example, within applicant's knowledge, it has been commercially impractical to manufacture fabricated welding wire (with substantial filler) of one-sixteenth inch diameter, utilizing conventional processes and which has the more-desired welding characteristics. However, by utilizing the process hereof, such welding electrode wire may be formed, not only commercially, but quite economically.

Figure 3:
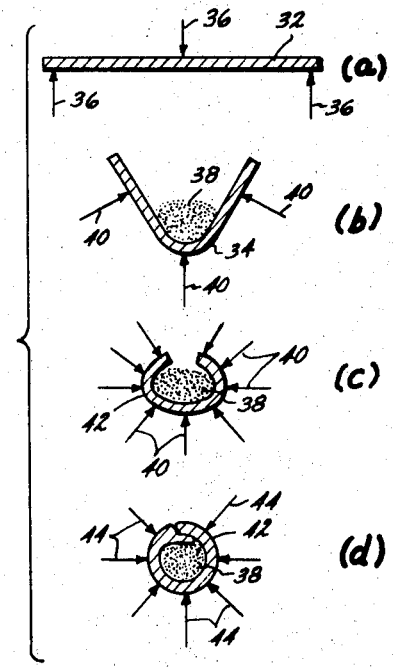
FIG. 3 is a series of cross-sectional views illustrative of the process of manufacturing welding wire in accordance with the present invention.

In accordance with the manufacturing process hereof, a flat strip of metal or tape 32 is first prepared, comprising a metal which may be cold formed and which is a desirable component of the finished wire electrode. For example, the strip 32 (FIG. 3a) may comprise mild steel tape 15/32" wide and .0095" thick. The initial step in forming the wire involves developing the strip 32 into an elongate trough 34 (FIG. 3b) as by any of a wide variety of different techniques. After formation of the trough 34 a quantity of filler 38 is dispensed into the length of the trough as by continuous-feed process. Subsequently, the trough 34 is compressibly closed as indicated by arrows 40 (FIGS. 3b and 3c) until the original strip 32 comprises a closed cylindrical tube 42 (FIG. 3d). The metal-working formation of the strip 32 into a closed tube 42 with the filler 38 therein may be performed in production, for example as disclosed in U.S. Pat. 1,629,748 and 1,640,859, issued to W. F. Stoody.

Subsequent to the formation of the closed tube as depicted in FIG. 3d, additional radial (rollingly applied) compressive forces are applied as indicated by the arrows 44 whereas to closely compact the filler 38 within the tube. This action reduces the diameter of the tube to accomplish wire of the desired size, intimately mates the components together and may reduce some of the particles. In this regard, it has been discovered that the combination of process manufacturing steps in which a filler 38 of particles below a critical size is used, coupled with the employment of compressive radially-applied rolling forces on the pre-formed tube enable the accomplishment of welding electrode wires down to a size of one-sixteenth of an inch and even smaller. In this regard, wires of one-sixteenth of an inch diameter may be accomplished economically in a continuous production operation and containing to 40% filler, and more by weight of the wire. It is also noteworthy that the thickness of the strip 32 is not substantially reduced, e.g. one-thousandth or so reduction.

Figure 5:
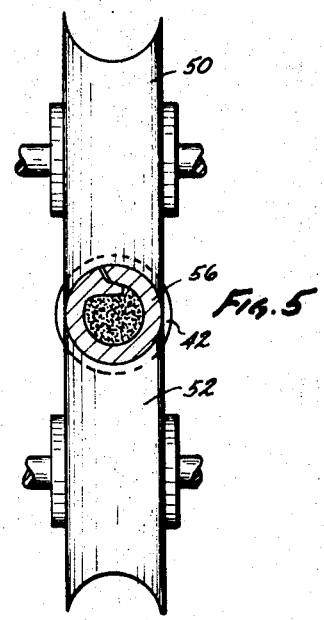
FIG. 5 is a vertical sectional view taken along line 5—5 of FIG. 4.
Figure 4:
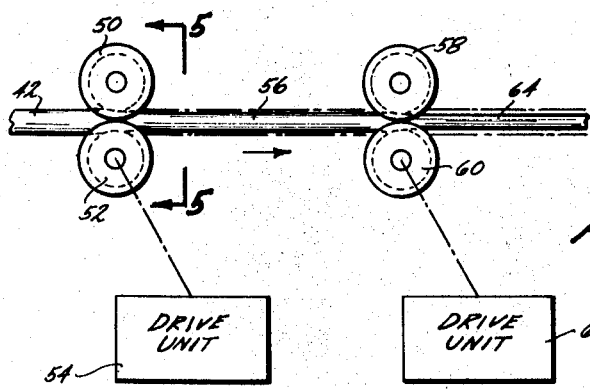
FIG. 4 is a diagrammatic view illustrating apparatus for manufacturing welding wire in accordance with the present invention.

Considering the continuous production of welding electrode in accordance herewith, it has been found effective and practical to compressively reduce the diameter of the preformed tube 42 by multiple-roller dies as depicted in FIGS. 4 and 5. Specifically, the pre-formed tube 42 is initially received between a pair of peripherally-grooved roller dies 50 and 52 which are in mating relationship and are driven by a drive unit 54. Thus, as the length of the tube 42 passes between the mating dies 50 and 52, it is reduced to a lesser diameter wire 56. Subsequently, the wire 56 passes between the peripherally-grooved roller dies 58 and 60 which may be angularly-offset and are driven by a unit 62, to accomplish further reduction. It is generally desirable to provide at least two forming stations to reduce the wire 64 to the desired size. In that regard, it is important to understand that the drive units 54 and 62 are independently driven. That is, the rollers 50 and 52 accept the tube 42 and in the process of reducing it to the wire 56 accomplish some elongation. Further elongation occurs in reducing the wire 56 to the final wire electrode 64. As a result, it is necessary to provide independent control of the drive units 54 and 62 so as to establish speed variation between the roller dies 50 and 52 and the roller dies 58 and 60. In the event such speed variation were not provided, the length of wire 56 would not be maintained proper in relation to the distance between the pairs of rollers.

In the process of producing the wire electrode 64 as described above, a wire variety of different materials may be employed depending upon the contemplated use of the wire. However, the structure of the present invention has been found particularly important with regard to the formation of stainless steel wires. In this regard, an exemplary wire which has been formed and represents a successful embodiment hereof comprises the following components in percentage by weight:

| | Percent |
|---|---|
| Ferro chromium | 10.0 |
| Chrome metal | 14.0 |
| Nickel powder | 10.5 |
| Manganese metal | 1.5 |
| Ferro silicon | 1.7 |
| Mild steel strip | 62.3 |

In accomplishing a continuous electrode from the above components, the ingredients (excepting mild steel strip) were reduced to particles which would pass a 200 mesh screen. The number of particles which would pass a 325 mesh screen was then reduced to 25% of the total weight of the filler. Subsequently, the individual particles were used as the filler material in conjunction with a mild steel strip which was cold formed into a containing tube. The structure was then compressively reduced to $\frac{1}{16}''$ diameter by rolling forces. It is to be noted that the filler particles comprise nearly 40% of the total weight, yet in use, the wire stood stress well. The resultant electrode wire accomplished spray-mode metal transfer at currents as low as 150 amps. Furthermore, arc voltages were accomplished which were 2 and 3 volts less than would have been attendant the use of solid welding wire.

In another exemplary construction, the following components were employed:

| | Percent |
|---|---|
| Chrome metal | 21.1 |
| Nickel powder | 12.5 |
| Manganese metal | 1.5 |
| Ferro silicon | 1.0 |
| Ferro molybdenum | 4.0 |
| Mild steel strip | 59.9 |

The above components (excepting the mild steel strip) were reduced to a nearly uniform size between 200 and 325 mesh. The chrome metal, manganese metal, ferro silicon and ferro molybdenum were next intimately mixed. That combination and the nickel powder were then separately fed onto the mild steel strip and thus employed as a filler within the mild steel strip, accomplished into a tubular shape by cold forming. After forming, the wire was reduced to a diameter of $\frac{1}{16}''$ by rolling and was tested in a welding application involving an inert gas environment. As a result, spray-mode operation was again accomplished at relatively low electrical current, e.g. down to 150 amps, and reduced voltage across the arc was also observed. The strength of the wire was quite satisfactory and in other tests, in spite of the fact that the wire may approach 50% filler, by weights satisfactory strength was obtained. In this regard, it appears that the combination of critically-sized smaller particles along with compressive forming affords a wire of satisfactory strength, even though the filler content is 50% by weight of the wire.

Still another exemplary electrode wire formed in accordance herewith has been produced from the following ingredients:

| | Percent |
|---|---|
| Chrome metal | 21.1 |
| Nickel powder | 10.5 |
| Manganese metal | 1.5 |
| Ferro silicon | 1.0 |
| Ferro columbium | .75 |
| Mild steel strip | 65.15 |

These components (excepting the mild steel strip) were reduced to a substantially uniform particle size of less than 200 mesh and having less than 20% of the particles therein under 325 mesh. The particle mixture was employed as a filler for the mild steel strip which was then cold formed and compressed by radially-applied compressive forces to develop a $\frac{1}{16}''$ diameter electrode wire. The resulting wire was employed in tests and again accomplished spray-mode operation at reduced electrical current, with reduced electrical voltage across the arc. Arc characteristics were good and a clean weldment was produced.

What is claimed is:

1. An electrode structure, for arc-welding deposition, comprising:
   a metallic strip enclosure, formed to define an internal chamber therein and having an external diameter of no more than $\frac{3}{32}''$; and
   a core, substantially filling said internal chamber and having a weight of at least 20% of the weight of a length of said electrode structure, said core consisting essentially of welding-wire material reduced to particle sizes not greater than 150 mesh particle size with no more than 25% by weight of said welding-wire material having a particle size of less than 325 mesh particle size.

2. An electrode structure according to claim 1 wherein said welding-wire material comprises chrome metal in quantity to accomplish at least 10% of chrome by weight in deposited metal.

3. An electrode structure according to claim 1 wherein said welding-wire material includes metal and wherein said metallic strip consists essentially of mild steel strip.

References Cited

UNITED STATES PATENTS

| 2,493,143 | 1/1950 | Ingels | 219—146.5 |
| 2,565,477 | 8/1951 | Crowell et al. | 219—146.5 |
| 3,029,165 | 4/1962 | Kihlgren | 219—146 |
| 3,033,977 | 5/1962 | Quaas | 219—146 |
| 3,047,708 | 7/1962 | Stark | 219—146 |
| 3,175,074 | 3/1965 | Culbertson | 219—146 |
| 3,179,787 | 4/1965 | Wasserman et al. | 219—146 |
| 3,334,975 | 8/1967 | Quaas et al. | 219—146 |

JOSEPH V. TRUHE, Primary Examiner

L. A. ROUSE, Assistant Examiner